United States Patent [19]

Dean et al.

[11] Patent Number: 4,609,168
[45] Date of Patent: Sep. 2, 1986

[54] REMOVABLE HELICOPTER EXTERNAL CARGO CARRYING FRAMEWORK

[75] Inventors: Edward H. Dean; Burnley R. Doxey; Daniel T. Diebler; Charles F. Swats, all of Newport News, Va.

[73] Assignee: The United States of America as represented by the Secretary of the Army, Alexandria, Va.

[21] Appl. No.: 674,807

[22] Filed: Nov. 26, 1984

[51] Int. Cl.$^4$ ............................................... B64D 9/00
[52] U.S. Cl. ............................... 244/137 A; 244/118.1
[58] Field of Search ............... 244/118.1, 118.2, 118.5, 244/127, 137 A, 137 R

[56] References Cited

U.S. PATENT DOCUMENTS

3,778,011 12/1973 Cannon ........................... 244/137 R
4,162,776 7/1979 Sibley et al. ..................... 244/118.1

Primary Examiner—Galen Barefoot
Assistant Examiner—Mark R. Valliere
Attorney, Agent, or Firm—Anthony T. Lane; Robert P. Gibson; Norman L. Wilson, Jr.

[57] ABSTRACT

Helicopters employed in emergency situations have been adapted for a variety of external uses. For example, step and cargo carriers have been attached to the skid supports of these helicopters. Gun mounts and camera mounts have been used. In order to provide for such external rigging, helicopters have been permanently altered. To avoid such permanent alterations straps or belts have been used to hold external equipment. However, the utility of such straps is extremely limited. It creates a stabilization problem. The invention herein provides an external cargo carrier capable of accepting a wide variety of external devices for use in emergency situations without permanently altering the helicopter. A totally self-contained framework is provided which includes stabilization means.

8 Claims, 10 Drawing Figures

REMOVABLE HELICOPTER EXTERNAL CARGO CARRYING FRAMEWORK

BACKGROUND OF THE INVENTION

This invention relates to the efficient use of helicopters, such as observation helicopters having cargo doors benind the crew doors. In particular, the invention is concerned witn an external framework which can be added temporarily to such helicopters to support equipment such as stretchers, load lines, personnel carriers, load platforms, seats and the like for a multitude of rescue and similar tasks. The invention will be especially useful where the helicopter must be employed in emergency situations.

The cargo areas of helicopters of the type characterized have been adapted for a variety of external uses. For example, U.S. Pat. No. 3,904,155 discloses a helicopter step and cargo carrier which attaches to the skid support of the helicopter. The carrier appears to accomodate a patient litter as well as other type cargo. U.S. Pat. No. 4,162,776 discloses a camera mount assembly for a helicopter, whereas U.S. Pat. No. 4,202,576 discloses a device for locking fixed support loads to the underside of an aircraft. Otner patents disclosing various arrangements for attaching cargo to an aircraft are U.S. Pat. Nos. 3,820,747, 3,778,011, 4,067,516 and 4,178,032. Special armament mounts have been anchored in hat sections within the cargo area. Cross arms have been secured to cargo area hat sections and artillery attached to the cross arm ends outside the helicopter. The cargo door has been cut away to permit the cross arm to extend outside the helicopter.

As the references show, in order to provide for external rigging helicopters are permanently altered. Doors are cut out, and hat sections are adapted to hold supports. One way to avoid such permanent alterations is to use straps or belts to hold external equipment. However, the utility of such straps is extremely limited. One of the disadvantages of nonpermanent prior art external cargo-carrying equipment such as straps, besides their limited use, is the problem of stabilization. It is impossible to eliminate vibrations and, in many instances actual movement, of the external apparatus. By the practice of this invention stabilization means are provided. The invention herein provides an external cargo carrier capable of accepting a wide variety of external devices for use in emergency situations without permanently altering the helicopter. A totally self-contained framework is provided.

SUMMARY OF THE INVENTION

The external cargo-carrying framework of this invention is, in essence, a prefabricated structure. An important advantage is that it utilizes the helicopter jack points, the cargo tiedown points in the rear floor, and the cargo hook attachment points as its points of attachment. Thus the apparatus of this invention is provided for a helicopter having jack fittings in its fuselage beneath its cargo doors along with a cargo hook attachment point in its fuselage bottom and cargo tiedown points in the rear floor. The invention encompasses the combination of an external cargo carrying framework with jack point, cargo tiedown point and cargo hook attachment point attaching means along with stabilization means.

DETAILED DESCRIPTION OF THE INVENTION

To make the invention its attachment means, and the stabilization means, more clear a specific embodiment thereof will be described in conjunction with the accompanying drawings.

Figure 1:
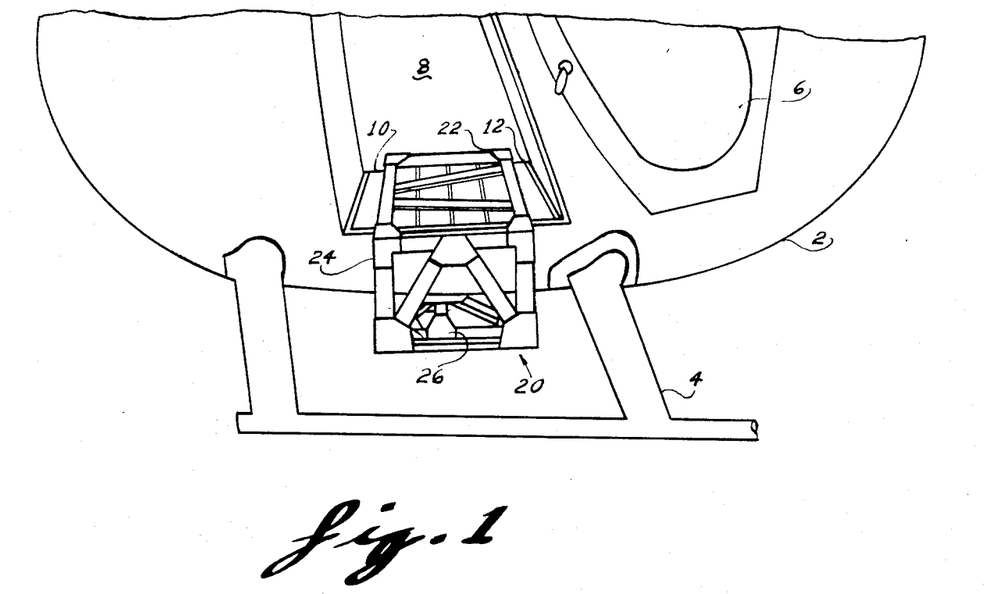
FIG. 1 is a side view of a helicopter showing the external cargo-carrying framework attached thereto in its working emplacement.

Referring now to FIG. 1, a helicopter 2 is shown with skids 4, crew door 6 and with its cargo doors removed leaving opening 8. Cargo deck 10 is shown in FIG. 1, along with hat sections 12. Across cargo deck 10 the cargo-carrying framework 20 of the invention is disposed. As can be seen, the cargo-carrying framework 20 has a reinforced top assembly 22, two side frames 24 depending therefrom, and a bottom frame structure 26 thereacross adjacent the cargo hook attachment point.

It will be appreciated that each of the four structures, the top, sides and bottom are prefabricated. In fact, for rapid installation top 22 and sides 24 are joined together using removable bolts 28 (FIG. 2) in plate 30 to form a yoke with side frames 24 depending perpendicularly from top frame 22 outside the helicopter. This yoke is inserted in door opening 8 to straddle cargo section 10 as shown in FIG. 1.

Figure 2:
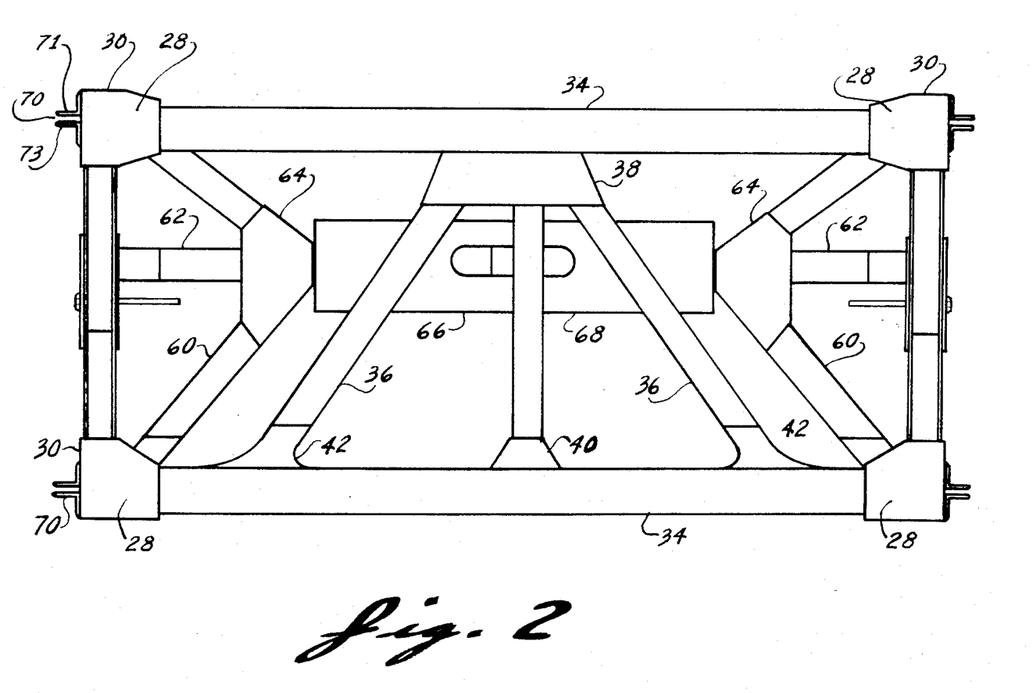
FIG. 2 is a top view of the framework of the invention.
Figure 3:
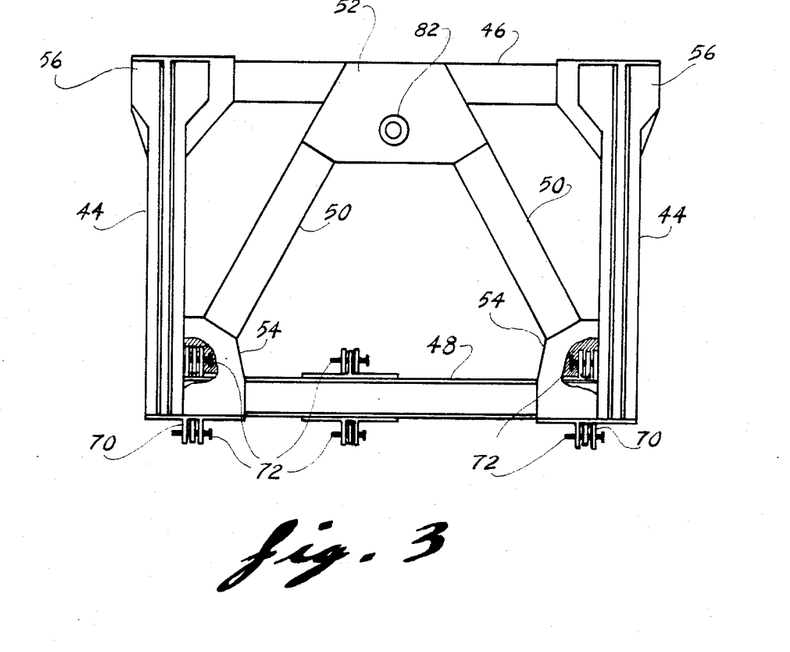
FIG. 3 is an end view showing the dependent framework sides.

Referring to FIG. 2 it is apparent that the top assembly (22, FIG. 1) is in the form of a reinforced frame of beams 34 and reinforced channels 36 secured by bolted plates 38, 40 and 42. To complete the yoke, retangular side frames, FIG. 3, incorporating side beams 44, top beams 46 and bottom beams 48, are provided. The side frames are reinforced by reinforcing beams 50, gusset 52, plates 54 and angles 56. The structure will be fabricated of lightweight high strength materials such as aluminum and plastics.

The bottom frame structure (26, FIG. 2) as well as the top assembly, is visible in FIG. 2. This bottom frame structure includes bottom braces 60, bottom beams 62 and bottom brackets 64. A tie assembly in the form of plates 66 and 68 (not visible therebehind) is secured to beam 62. One of the features of the cargo-carrying framework of this invention is its rapid installation. Once the yoke, which is preassembled, is in place across the cargo area, the attachment of bottom frame structure 26 to the yoke, in actuality to side frames 24, can be readily accomplished. To this end fittings 70 are provided. Quick disconnect pins 72 (FIG. 4) can then be rapidly inserted into the fittings to fasten the bottom frame structure to the two side frames to complete the assembly of the cargo-carrying framework.

We shall now examine how the cargo-carrying framework is attached to the helicopter and how it is stabilized. For rapid installation, as alluded to hereinbefore, and in order to make no modifications to the helicopter other than to remove its door, the jack point fittings beneath the cargo area and the cargo hook attachment point in the helicopter bottom 80 are used. The front view illustrated in FIG. 4 will make this clear.

Figure 4:
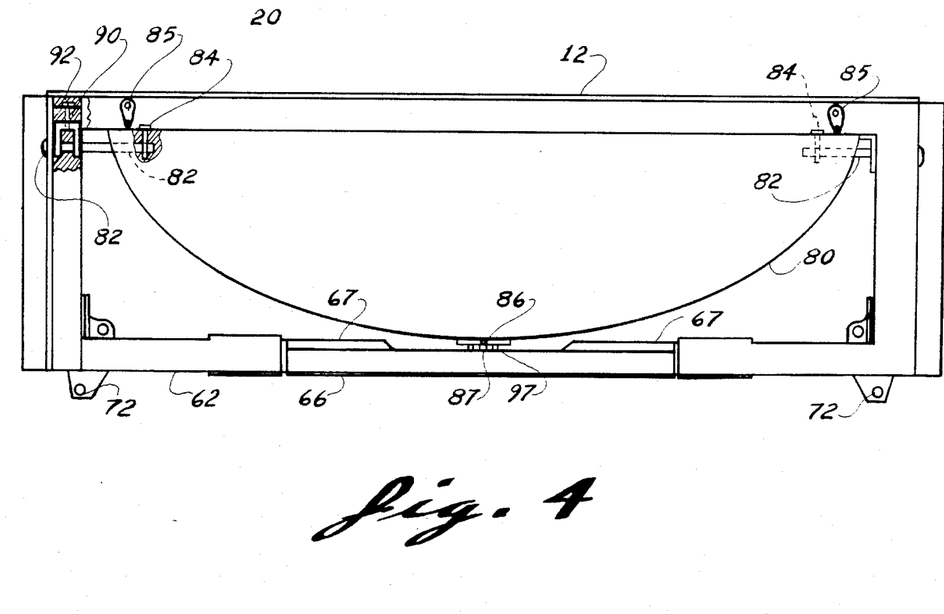
FIG. 4 is a front view of the framework of the invention showing its stabilization means.

In FIG. 4 hat section 12, bottom beams 62, tie assembly 66, including angle 67 and quick disconnect pins 72 are shown.

Securing the cargo-carrying framework 20 to the helicopter are jack pins 82. The jack pin fittings are removed from the jack points and the jack pins 82 are inserted in the jack point sockets. Holes in the end of the jack point pins accept bolts or locking pins 84 so that the pins cannot accidently work out of the sockets. In addition to the jack point pins and the cargo hook attachments bolts, standard cargo tiedowns 85 in the hat section are utilized to hold the cargo-carrying framework as shown in FIG. 4.

As indicated previously, the other point of attachment for supporting the cargo-carrying framework is cargo hook attachment point 86. It has been emphasized, however, that it is important that attaching means in the bottom frame structure 26 be in perfect alignment with the cargo hook attachment point. Inasmush as this would require precision in fabrication inconsistent with the rapid assembly apparatus, jack point pins 82 are longer than necessary in order to permit side-to-side movement of the cargo-carrying framework so that attaching bolt or pin 87 can be lined up with the cargo hook attachment point 86. By rendering the cargo-carrying framework, actually the yoke thereof, slidable on jack point pins 82 the alignment of the attachment means and the cargo hook attachment point is readily accomplished. This alignment method however, introduces an element of instability. Means to prevent this movement must accordingly be provided. Various clamping means can be so used. In the embodiment depicted in FIG. 4 a clevis 90 is employed. The jack point pin passes through the clevis tangs or ears to afford the grip area. The clevis shank is threaded or a bolt 92 is used as the shank to draw up or tighten the clevis, putting the jack pins under tension, thus inhibiting lateral movement and other vibrations, thereby stabilizing the apparatus.

Referring now to the installation sequence, top frame 22 end frames 24 are assembled using bolts 28. The aircraft cargo doors are removed and the yoke thus assembled is passed through the cargo doorway to rest on the cargo floor like the saddle on a horse. A strong jack point pin 82 is slipped through a clevis 90 on each frame end, and into the jack point sockets on each side of the fuselage. The bottom frame structure is slipped under the fuselage and raised up to align the 6 connection fittings 70 with the bottom frame structure fittings. The 12 quick disconnect pins 72 are then inserted in fittings 70. An attachment means must then be aligned with the cargo hook attachment point in the bottom of the fuselage. This is done by sliding the unit on its jack point pins until the proper alignment is achieved. A connection, usually a plate with four bolts, is then made to the cargo hook attachment point. To stabilize the unit bolt 92 of clevis 90 is then tightened to complete the installation.

Figure 5:
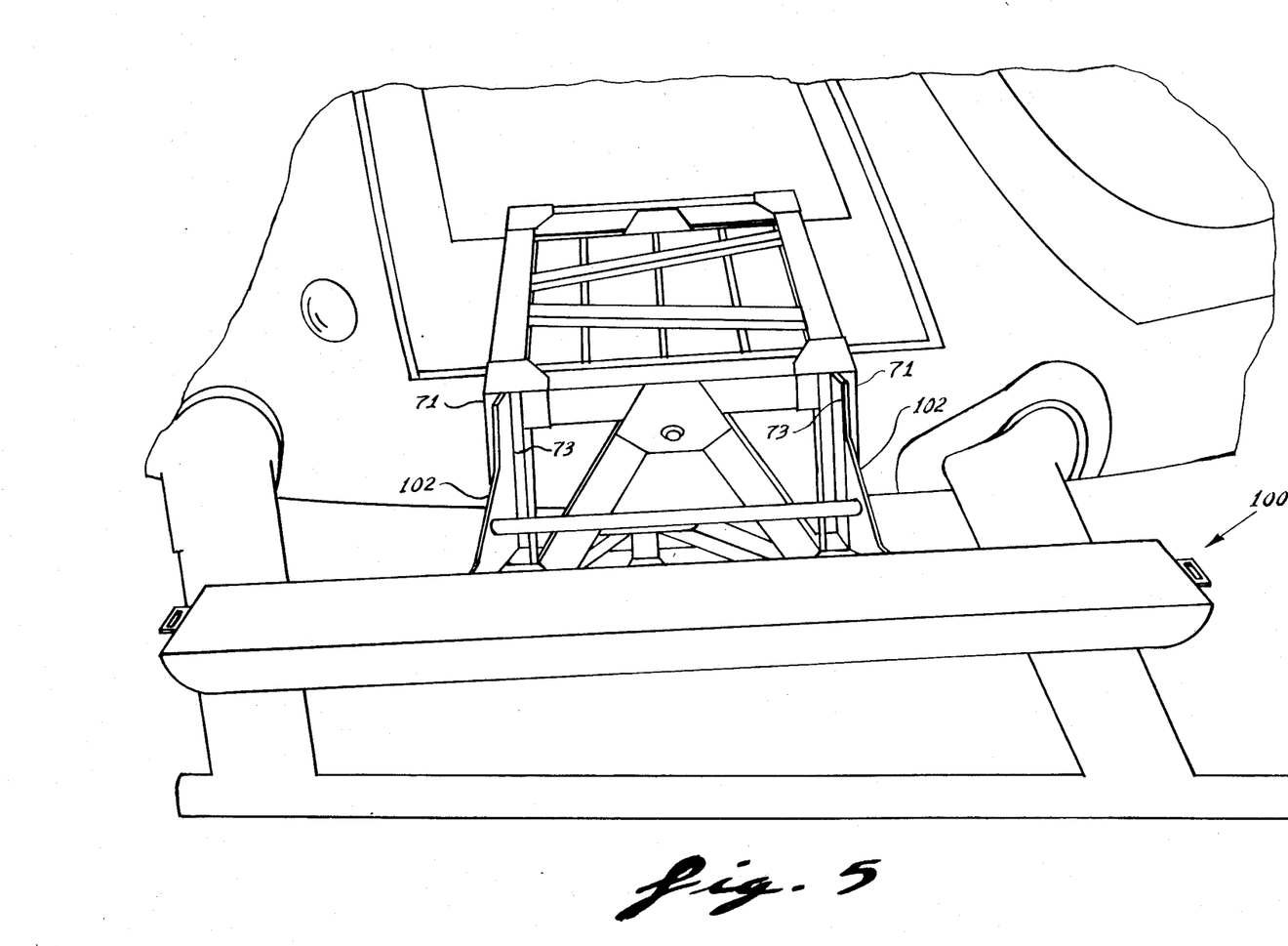
FIGS. 5 through 10 show various embodiments of the invention.

Having been given the description of this invention various modifications and refinements are possible, and others will occur to those skilled in the art. Thus, it is desirable to have a universal joint 97 at the cargo hook attachment point. This universal joint can be used for cargo load lines and the like. It will be understood also that cargo-carrying framework 20 can be used for bolting or clamping thereon various emergency and rescue devices of the types shown in FIGS. 5 thru 10. In FIG. 5 a cargo platform 100 is illustrated. In this embodiment fittings 70, FIG. 2, on the side frames 24 of cargo-carrying framework 20 are utilized. As can be seen in FIG. 2, these fittings 70 are in the form of adjacent L-members 71 and 73. As shown in FIG. 5, platform 100 is provided with plates 102 which are inserted between L-member 71 and 73. Bolts can be passed through the L-members and plates to hold platform 100, or other means such as clamps can be employed to hold the platform. Various items can be loaded on the platform, or it can be employed, in an emergency, for personnel.

Figure 6:
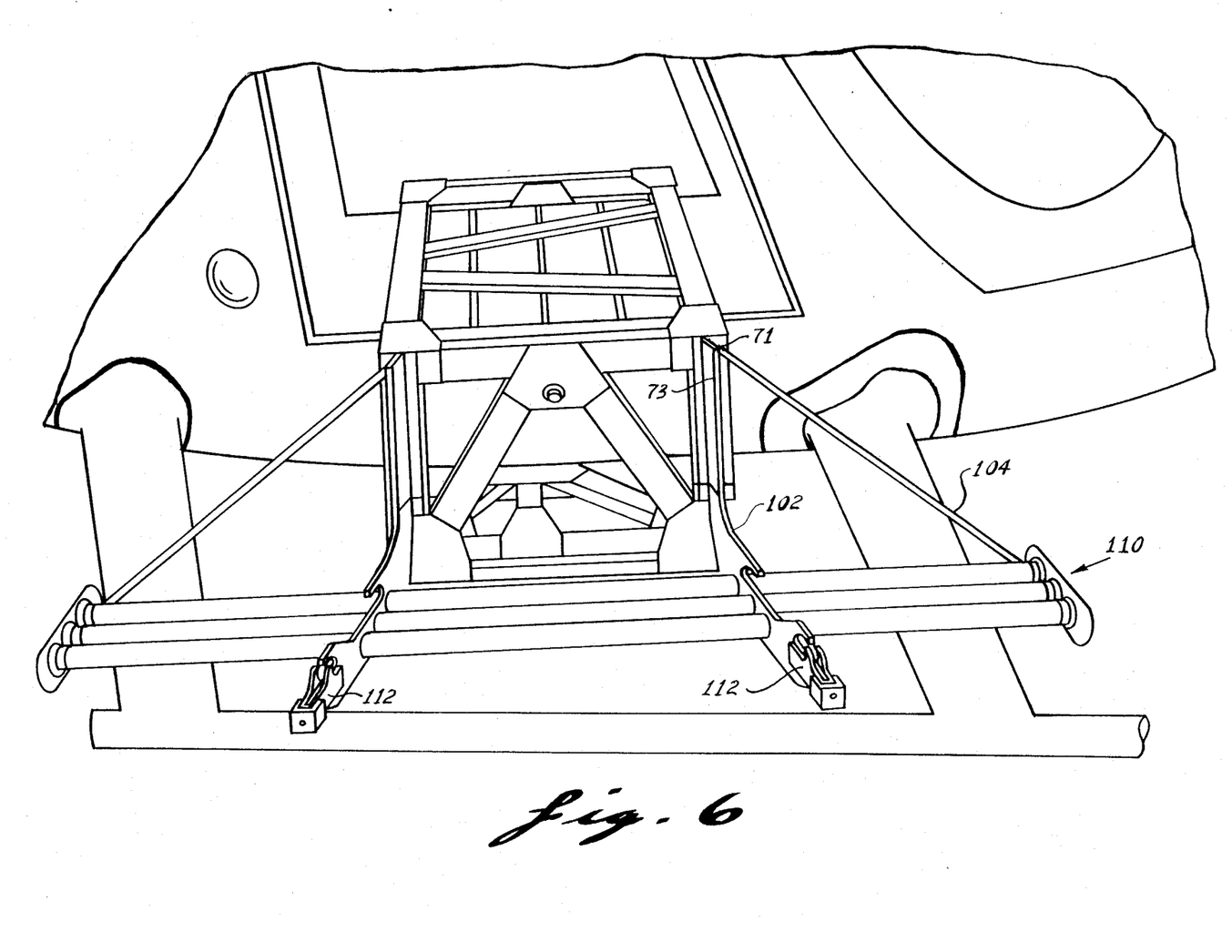

In order to accommodate taller loads to be held a significant distance below the plane of the main rotor, a load-carrying platform 110, FIG. 6, is provided. This platform also carries a plate 102 adapted to be inserted in the slot provided by L-members 71 and 73. These plates, along with braces 104 stabilize the platform. In addition to carrying cargo and personnel platform 110 is designed to carry a Stokes litter. Means 112 are provided for locking the litter in place. The platform shown in FIG. 6 is particularly useful when the cargo is so heavy that it affects the helicopter's flight characteristics. Using this platform, a requisite low center of gravity can be maintained.

Figure 7:
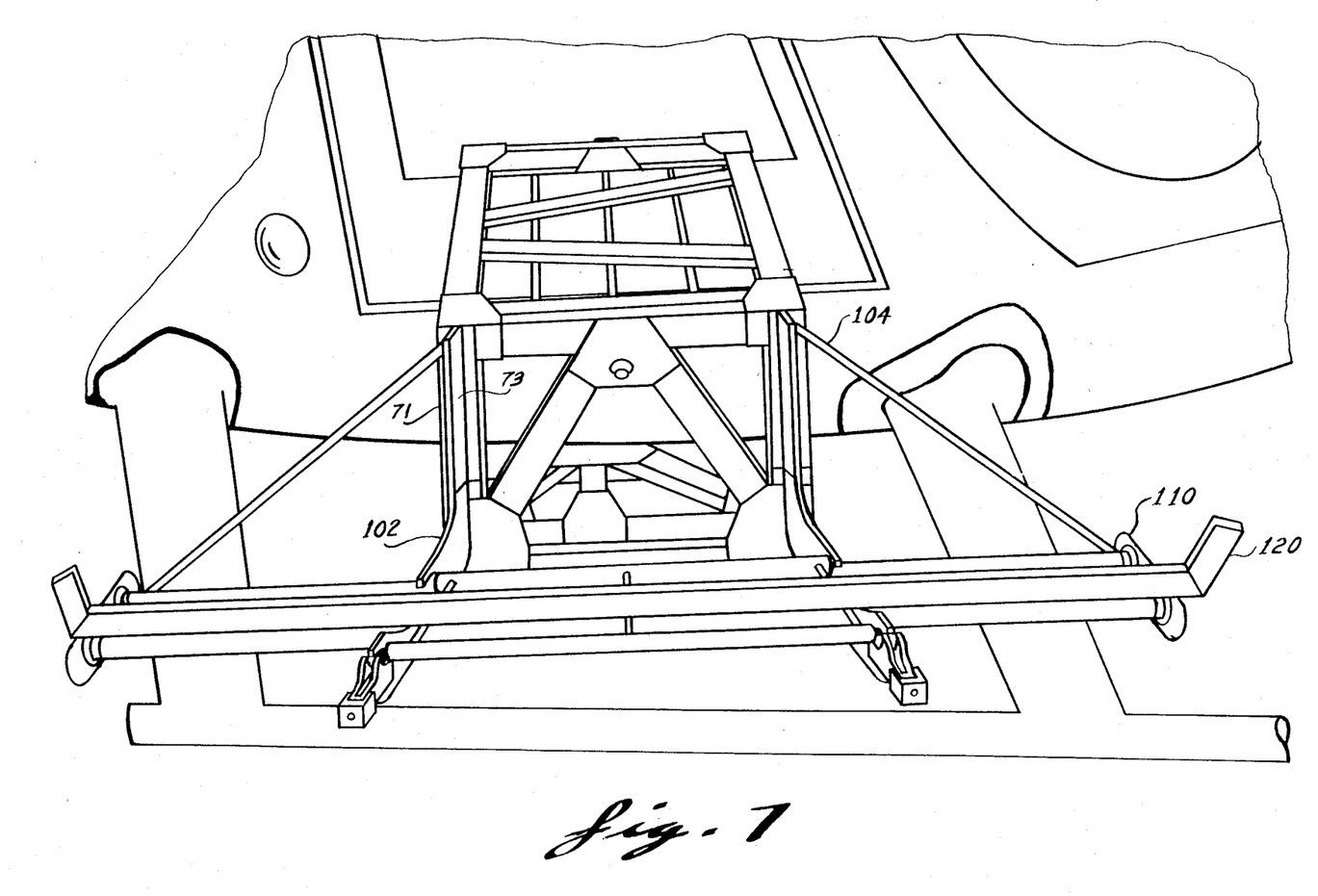

It may be necessary to transport motorcycles from one place to another by helicopter rather than cargo plane. To this end, motorcycle carrier 120, FIG. 7, is attached to load-carrying platform 110. The bottom of the motorcycle carrier 120 is adapted so that the securing mechanism 112, which holds a litter, also holds the motorcycle carrier. Tiedowns are used to hold the motorcycle in the carrier.

Figure 8:
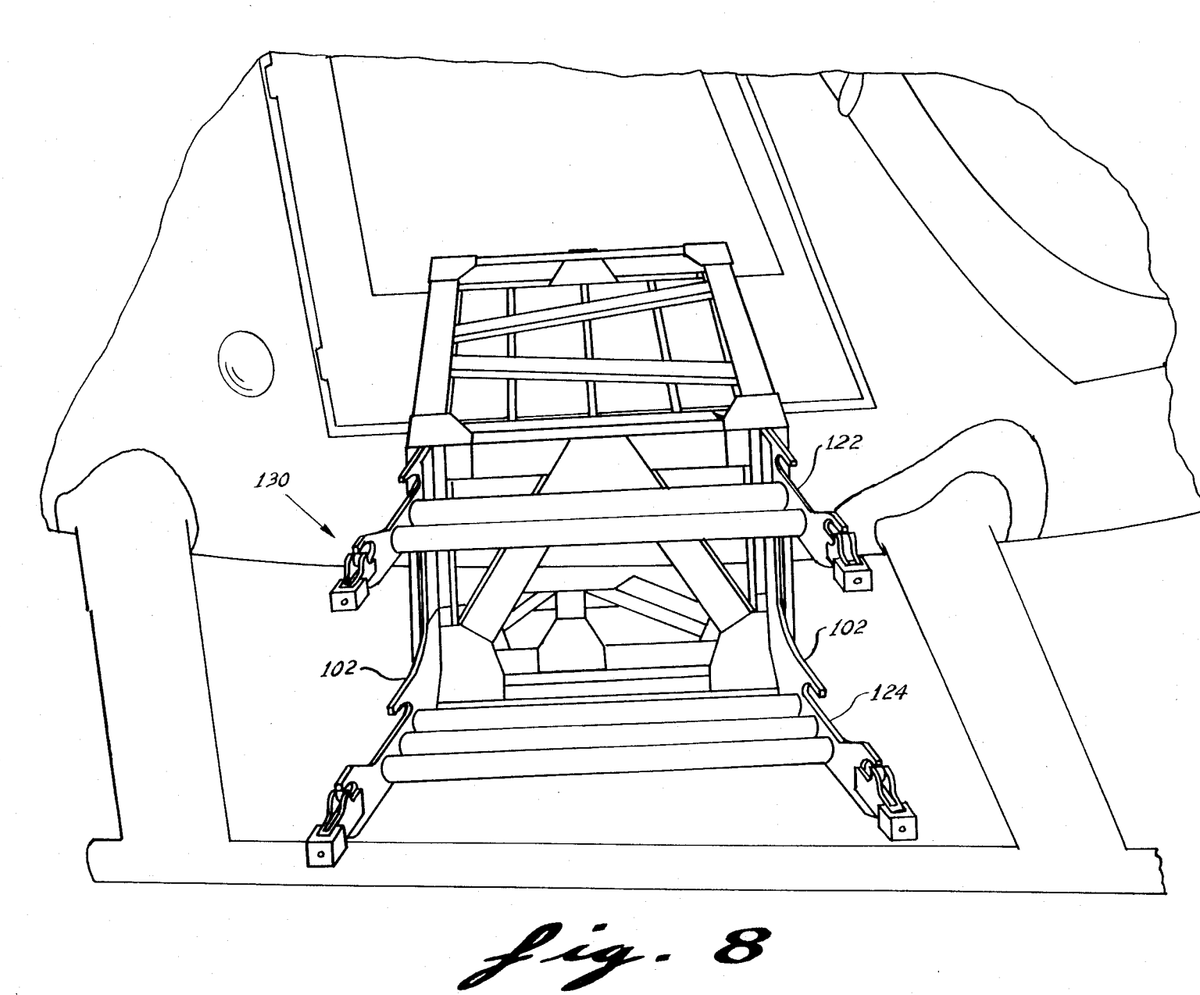

There may be emergencies calling for more than one litter on each side of the helicopter, or two cargo load platforms on each helicopter side. To meet these demands, double load platform 130 is provided as shown in FIG. 8. In this instance, both platforms 122 and 124 are secured to plate 102, utilized as explained earlier. The two Stokes litters are attached as was the single litter previously described, using plate 102.

Figure 9:
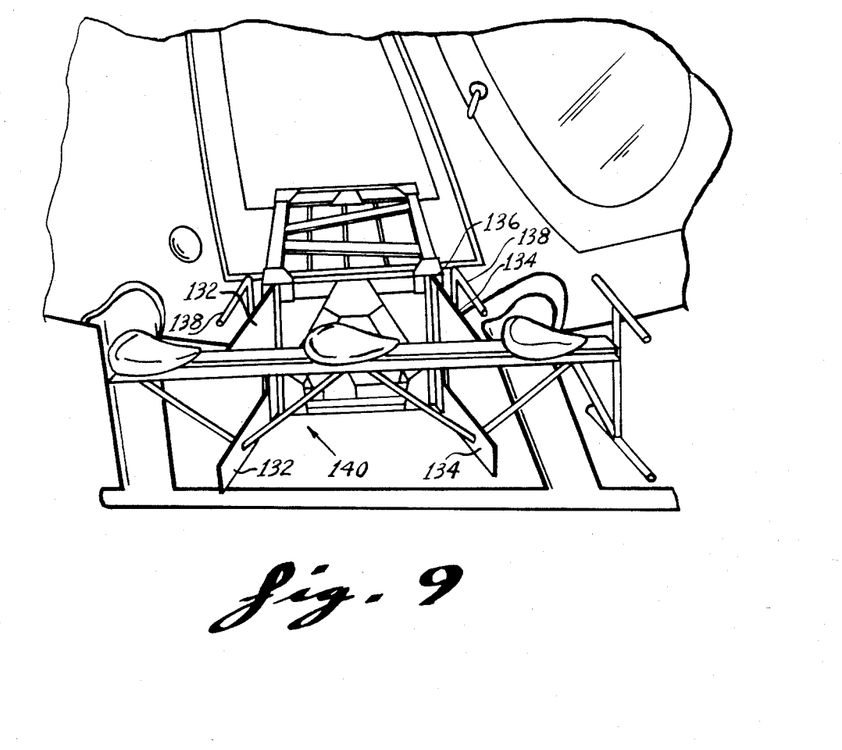

A means of carrying personnel, rather than merely picking them up and moving them, as would be the case with the platforms, is sometimes required, particularly in the case of soldiers. The bicycle seat fixture 140 is such a means. Plates 132 and 134 are bolted or otherwise secured between the L-members at 136 as set forth hereinbefore. Hand grips 138 are included and plates 132 and 134 are cut away to provide foot rests. It is conceivable that fire power may be required. If it is, the fixture 140 can be reversed so that the soldiers can ride backwards. Sufficient room will be allowed between them to permit them to fire shoulder arms.

Figure 10:
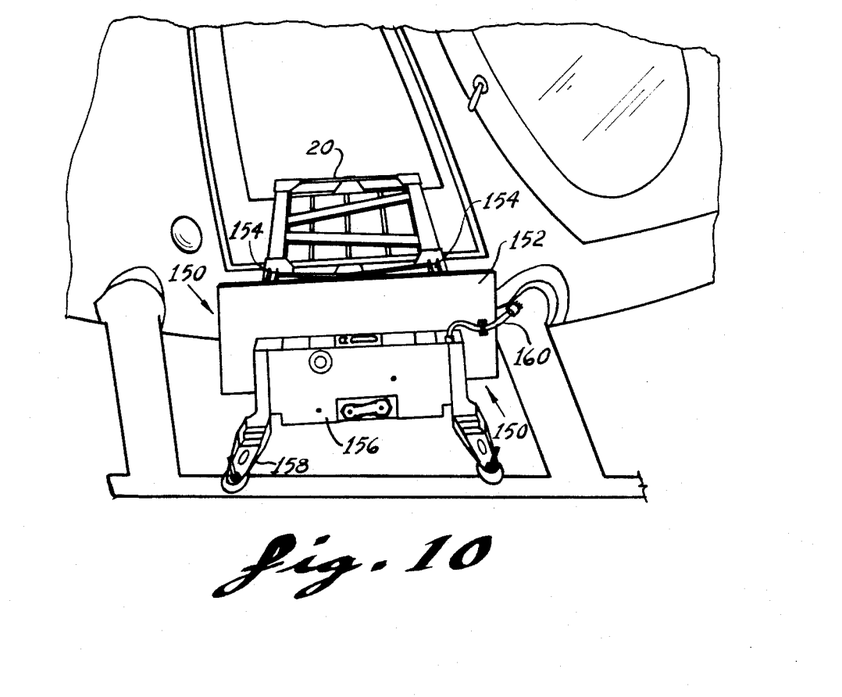

There may be instances when it is desirable to adapt an observation helicopter with Army inventory weapons such as rocket firing or 7.62 mm self-contained minigun pods. To this end, weapons mount 150 is provided as shown in FIG. 10. The weapons mount includes a mounting plate 152 and channel bars or sections 154 attached to the cargo carrying framework 20 of the invention. In the embodiment shown in FIG. 10, a standard ejector rack 156 is shown attached to the weapons mount 150. This rack provided with weapon rests 158 and jettison power supply cord 160 carries ammunition, missiles, or other weapons.

In the light of embodiments shown in FIGS. 5 through 10, it will be appreciated that the cargo-carrying framework of the invention permits a variety of functions to be effected by an observation sized helicopter without the aircraft having been permanently altered. Such functions and attachments are deemed to be within the scope of this invention.

What is claimed is:

1. In a helicopter having a cargo section with doors and a cargo deck floor, hat section cargo-tie-down points, jack point fittings in its fuselage beneath its cargo doors, and a cargo hook attachment point in its fuselage bottom, the combination of (A) a self-contained, external cargo-carrying framework, with (B) framework attachment means and with (C) stabilization means in the form of a clamping mechanism securing under tension the framework to jack point fittings to achieve said stability, wherein the external cargo-carrying framework (A) includes (1) a yoke adapted to rest on the cargo deck to straddle the cargo section and to extend through the cargo door openings, entailing a top assembly in the form of a reinforced frame fitting the cargo section and having detachably bolted yoke side frames depending perpendicularly therefrom, outside the helicopter completing the yoke, (2) a bottom frame structure, (3) quick disconnect pin means for attaching the bottom frame structure to the yoke side frames beneath the fuselage adjacent the cargo hook attachment point, (4) means for attaching the bolted side frames to the jack point fittings, (5) means for attaching the bottom frame structure to the cargo hook attachment point, and (6) means on the side frames for attachment thereto of a cargo carrying device.

2. The combination of claim 1 wherein framework attachment means (B) includes (a) jack point pins replacing the jack point fittings, extending through each yoke side frame into the jack point sockets, (b) means locking the jack point pins in the jack point sockets, and (c) bolt means for attaching the framework bottom to the helicopter cargo hook attachment point, jack point pin lengths rendering the framework slidable from side to side, enabling the bolts means to be aligned with the cargo hook attachment point.

3. The combination of claim 2 wherein stabilization means (C) includes a clevis, the jack point pin passing through the tangs thereof, and means for tightening the clevis putting the jack pin under tension to inhibit framework movement, thereby stabilizing the combination.

4. The combination of claim 3 wherein a cargo carrying device is attached to said combination.

5. Tne combination of claim 4 wherein the cargo carrying device is a cargo platform.

6. The combination of claim 4 wherein the cargo carrying device is a a footboard.

7. The combination of claim 4 wherein the cargo carrying device is a personnel carrier equipped with seats.

8. The combination of claim 4 wherein the cargo carrying device is a motorcycle carrier.

* * * * *